(12) United States Patent
Yamashita

(10) Patent No.: US 7,586,727 B2
(45) Date of Patent: Sep. 8, 2009

(54) INRUSH CURRENT LIMITING SWITCHING CIRCUIT FOR POWER SUPPLY

(75) Inventor: Tsuyoshi Yamashita, Anjo (JP)

(73) Assignee: DENSO Corporation, Kariya (JP)

( * ) Notice: Subject to any disclaimer, the term of this patent is extended or adjusted under 35 U.S.C. 154(b) by 261 days.

(21) Appl. No.: 11/529,545

(22) Filed: Sep. 29, 2006

(65) Prior Publication Data
US 2007/0091528 A1    Apr. 26, 2007

(51) Int. Cl.
 *H02H 9/08* (2006.01)
 *H02B 1/24* (2006.01)
(52) U.S. Cl. .................. 361/93.9; 307/131; 323/908
(58) Field of Classification Search ............ 323/222, 323/271, 908; 361/93.5, 93.6, 93.7, 93.9; 307/125, 131
See application file for complete search history.

(56) References Cited

U.S. PATENT DOCUMENTS 5,416,290 A * 5/1995 Magara et al. ........... 219/69.18

FOREIGN PATENT DOCUMENTS

| JP | H06-233402 | 8/1994 |
| JP | A-H09-201066 | 7/1997 |
| JP | A-H10-146050 | 5/1998 |
| JP | H11-346476 | 12/1999 |
| JP | 2005-102471 | 4/2005 |

OTHER PUBLICATIONS

Van Bosse: "Signalling in Telecommunication Networks" 1998, John Wiley & Sons, New York, pp. 356-358.
Examination Report mailed Nov. 6, 2007 in JP Application No. 2004-161146 with English translation.

* cited by examiner

*Primary Examiner*—Jessica Han
*Assistant Examiner*—Emily Pham
(74) *Attorney, Agent, or Firm*—Nixon & Vanderhye P.C.

(57) ABSTRACT

An inrush current limiting power supply switching circuit is disclosed including a first switch through which an electrical load, having a capacitor, and a direct current power supply are connected, a second switch turned on prior to the first switch when supplying electric power from the direct current power supply to the electrical load, an inrush current limiting circuit connected in parallel to the first switch and having an inrush current limiting resistor connected to the second switch in series, and a monitoring circuit for monitoring a second-switch-shutoff leak current flowing through a diode, connected in series to the second switch in an orientation in which electric power is supplied, when both the first and second switches are off.

12 Claims, 3 Drawing Sheets

INRUSH CURRENT LIMITING SWITCHING CIRCUIT FOR POWER SUPPLY

CROSS REFERENCE TO RELATED APPLICATION

The present application relates to and incorporates by reference Japanese Patent application No. 2004-161146 filed on May 31, 2004.

BACKGROUND OF THE INVENTION

1. Technical Field of the Invention

The present invention relates to inrush current limiting switches and, more particularly, to a vehicular inrush current limiting switching circuit for a power supply, the switching circuit for enabling or disenabling the supply of electric power from a direct current power supply to vehicular electrical loads including a large capacity capacitor.

2. Related Art

With a hybrid vehicle, a secondary battery powered vehicle and a fuel cell powered vehicle, a direct current power supply, such as a secondary battery, a fuel cell or the like, supplies electric power via an inverter circuit to an alternating current motor for generating traction power. The inverter circuit converts direct current power of the direct current power supply into alternating current power for supply to the alternating current motor. The inverter circuit is switched on and off at a high frequency under PWM control for speed control of the motor. This causes variation of current to occur with the resultant higher harmonic current components, which are superposed on a power supply voltage as switching noise via wiring inductance while causing electromagnetic noise to occur. In order to absorb such switching noise, smoothing capacitors are connected in parallel to inputs of the inverter circuit in general practice. Such smoothing capacitors are also similarly applied to, in addition to the inverter circuit of the alternating current electric motor, a DC/DC converter circuit.

Further, for the purpose of checking, repairing and replacing the direct current power supply or electrical loads such as the inverter circuit or the like, a main power switch (first switch) is commonly connected between both of these component parts. In addition, in a case where a smoothing capacitor with large capacity is connected in parallel to the electrical loads, a large inrush current instantaneously flows from the direct current power supply to the smoothing capacitor when the main power switch is turned on. Similarly, the large inrush current may also flow, in another case where an electrostatic capacitance accompanied with the electrical loads is large. For limiting such inrush current, an inrush current limiting circuit, including an in rush limiting resistor and a subsidiary power switch (second switch) connected in series, is preferably connected to the main power switch in parallel thereto.

When the direct current power supply begins to supply electric power to the electrical loads and the parallel connected smoothing capacitor, the subsidiary power switch is initially turned on. This allows the smoothing capacitor to be charged at a slow speed via the inrush current limiting resistor. The main power switch is turned on at a stage where a terminal voltage of the smoothing capacitor is adequately raised, causing electric power to be directly supplied from the direct current power supply to the electrical loads.

Since the subsidiary power switch is turned on and off within short time intervals when commencing the supply of electric power to the electrical loads, the subsidiary power switch often includes a semiconductor-switching device whose switching timing can be easily controlled. The semiconductor-switching device has an advantage with a small size and low power consumption but encounters a shutoff failure causing a large leak current to flow regardless of an off state because of the semiconductor-switching device including a noncontact switch. Although such a leak current failure rarely occurs in the form of a sudden increase, it's often the case that the leak current increases with age resulting from progress in deterioration of the semiconductor-switching device.

In order to monitor an operating status of the vehicular electric system mentioned above and detecting a failure at an earlier stage to maintain performance of the vehicle, research and development work has been done to provide, for instance, an inverter-circuit failure detecting circuit disclosed in Japanese Unexamined Patent Application Publication No. 6-233402 and a capacitor failure detecting device disclosed in Japanese Unexamined Patent Application Publication No. 11-346476. Further, another development has been done to provide a detecting device, related to a shutoff failure of a subsidiary power switch, which is disclosed in Japanese Unexamined Patent Application Publication No. 2005-102471.

Such devices address issues wherein as the subsidiary power switch encounters the shutoff failure causing the flow of a large leak current regardless of an off state in nature, the circuit undergoes a defect such as overheating and, further, a risk of an electrical shock occurs during inspection of the circuit while causing the draining to occur in the direct current power supply.

However, with such devices, the inrush current limiting resistor, connected to the subsidiary switch in series, is used as a sensor to detect the leak current occurring in the shutoff failure of the subsidiary power switch. That is, measuring a voltage drop occurring across both terminals of the resistor on the basis of such leak current allows the monitoring to determine whether or not the subsidiary power switch encounters the shutoff failure.

However, the inrush current limiting resistor directly affects an inrush current limiting characteristic. Therefore, in designing a performance of detecting the leak current occurring in the shutoff failure of the subsidiary power switch, an issue arises with the occurrence of restrictions where the inrush current characteristic needs to be considered at the same time.

More particularly, these restrictions are listed as described below. With the subsidiary switch encountered with a failure, a leak current flows from the direct current power supply and passes through the electrical loads and the smoothing capacitor to the inrush current limiting circuit. Consequently, a resistance value of such a resistor determines a charging time constant of the smoothing capacitor, that is, an inrush current characteristic. For this reason, such a resistance value cannot be necessarily convenient for detecting the leak current.

This is because there is a requirement wherein the inrush current characteristic needs to be determined so as to rapidly charge the smoothing capacitor such that a vehicle is available to start to run within a limited time interval. Due to such a requirement, the resistance value needs to lie in a value less than a fixed value.

As a result, a voltage drop resulting from such resistor becomes less than a fixed value and, sometimes, the leak current becomes hard to be measured with a simplified circuit structure.

SUMMARY OF THE INVENTION

The present invention has been completed with a view to addressing the above issues and has an object to provide an inrush current limiting switching circuit that minimizes a complexity of a circuit structure while enabling a shutoff failure of a second switch to be detected at an earlier stage.

In addition, it is a further object of the present invention to provide an inrush current limiting switching circuit that is capable of designing a performance of detecting a shutoff failure of a given second switch without facing restrictions on design for an inrush current limiting circuit to satisfy an inrush current control characteristic.

The present invention contemplates the provision of a circuit structure wherein under a status where both the first and second switches are off state with disconnecting electrical loads, if the second switch remains under a normal state, a current flowing through an inrush current limiting circuit is monitored to detect a failure of the second switch almost without affecting an inrush current control characteristic naturally inherent to the rush current limiting circuit.

The present invention provides an inrush current limiting switching circuit comprising a first switch through which electrical loads, having a capacitance, and a direct current power supply are connected, a second switch turned on prior to the first switch when supplying electric power from the direct current power supply to the electrical loads, an inrush current limiting circuit connected in parallel to the first switch and having an inrush current limiting resistor connected to the second switch in series, and a second-switch shutoff failure monitoring circuit using a diode connected in series to the second switch in an orientation not to obstruct the supplying electric power for monitoring a current magnitude flowing through the diode when the first and second switches are off state so as to sense the current flowing through the diode.

Preferably, the monitoring circuit may comprise an outputting circuit outputting an output signal reflecting a detected current magnitude, and outputting the signal to a control device outside the inrush current limiting switching circuit.

Preferably, the monitoring circuit may comprise the outputting circuit and a detection judging section detecting an output signal from the outputting circuit and judging whether or not the output signal exceeds a threshold value upon which judgment is made that when the output signal exceeds the threshold value, the second switch encounters a failure.

More preferably, the second switch may comprise a semiconductor-switching device.

DETAILED DESCRIPTION OF PREFERRED EMBODIMENTS

Hereunder, an embodiment according to the present invention and related modified forms will now be described below.

Figure 1:
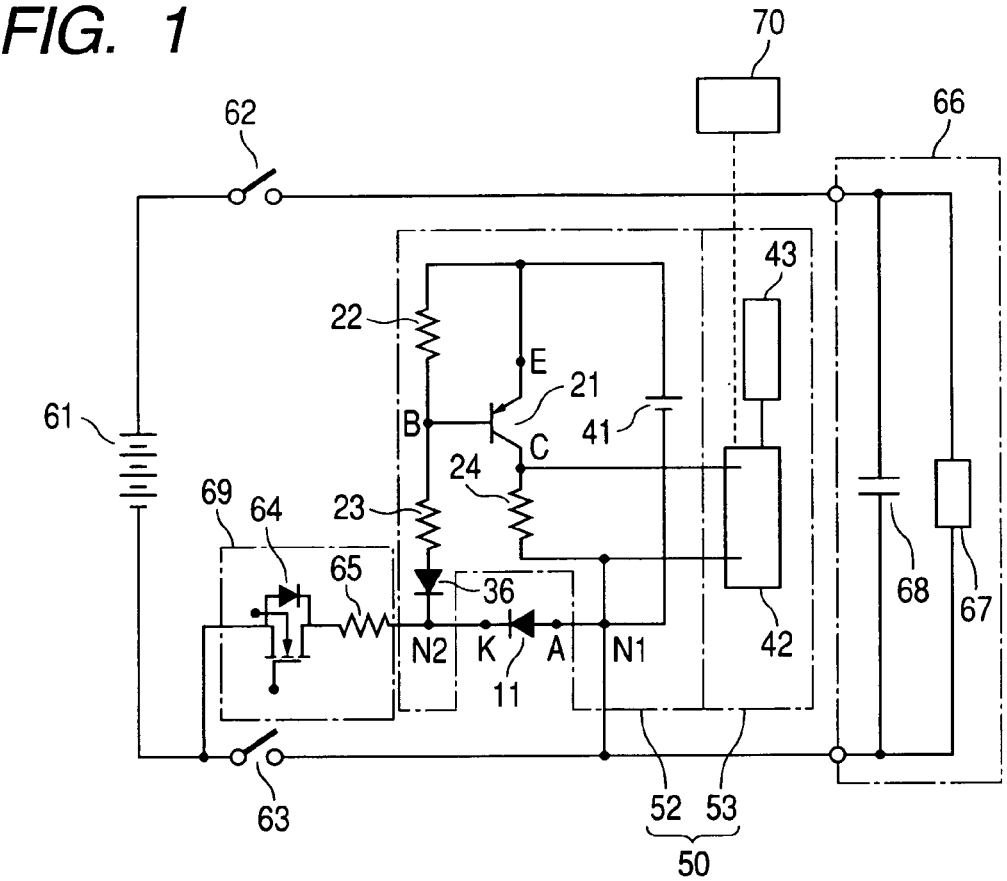
FIG. 1 is a circuit diagram showing an inrush current limiting switching circuit of one embodiment according to the present invention.

FIG. 1 shows a best mode of the embodiment according to a direct current power supply to which the present invention is applied.

This direct current power supply (first power supply, battery) 61 is connected to a load circuit 66 via two main power switches (first switches) 62, 63 and a subsidiary power switch (second switch) 64. The load circuit 66 comprises an electrical load 67 and a smoothing capacitor 68 connected in parallel thereto.

With a vehicular inrush current limiting switching circuit for a power supply according to the present invention, the battery 61 has a positive electrode terminal connected to the load circuit 66 via the main power switch 62 on the positive electrode side and a negative electrode terminal connected to the load circuit 66 via the main power switch 63 on the negative electrode side. An inrush current limiting circuit 69 comprises the subsidiary power switch 64, and an inrush current limiting resistor 65. The subsidiary power switch 64 and the inrush current limiting resistor 65, forming the inrush current limiting circuit 69, and a diode 11 (sensor diode 11) acting as a sensor of a monitoring circuit described later are connected to the battery 61 in series in such an order. The inrush current limiting circuit 69 is connected to the battery 61 in parallel to the main power switch 63 on the negative electrode side.

A subsidiary power switch shutoff failure monitoring circuit 50 (hereinafter referred to as a monitoring circuit 50) comprises an outputting section (outputting circuit) 52, outputting an output reflecting a current value flowing through both terminals N1, N2, and a detection judging section 53 for detecting and judging a signal output from the outputting section 52. The outputting section 52 includes a PNP type transistor 21, resistors 22 to 24 and a direct current control power supply (second power supply) 41. The detection judging section 53 comprises a detecting section 42 and a judging section 43. The diode 11 has an anode terminal and a cathode terminal that are designated at A, K, respectively. The transistor 21 has an emitter terminal, a base terminal and a collector terminal that are designated at E, B, C, respectively.

The diode 11 is provided for delivering a current flowing through the inrush current limiting circuit 69, which is equal to a current flowing through the subsidiary power switch 64 in this circuit arrangement, to the monitoring circuit 50. That is, the sensor diode 11 acts as a sensor of the detection circuit 50 to sense the current flowing through the subsidiary power switch 64.

The PNP type transistor 21, the direct current control power supply 41, the detecting section 42 and the judging section 43 of the monitoring circuit 50 are connected in a manner described below. The emitter terminal E of the transistor 21 is connected via the resistor 22 to the base terminal B, which in turn is connected to the cathode terminal K of the diode 11 via the resistor 23 and a protection diode 36. The collector terminal C is connected to the anode terminal A of the diode 11 via the resistor 24.

Also, the control power supply 41 may operate for such a detection circuit only or may be shared with a power supply for another monitor control and have an output voltage and current capacity less than those of the direct current power supply. The protection diode 36, acting to protect the transistor 21 from surge voltages, may be omitted.

The control power supply 41 has a positive electrode terminal connected to the emitter terminal E of the transistor 21 and a negative electrode terminal connected to anode terminal K of the diode 11.

Further, a detecting section 42 is connected between the collector terminal C of the transistor 21 and the anode terminal A of the diode 11 for detecting a voltage drop occurring across the resistor 24.

With the detection judging section 53, the detecting section 42 is connected so as to output a detected voltage or a related detection signal to the judging section 43. Here, the judging section 43 may be mounted inside the monitoring circuit 50 or mounted on a control unit 70 outside the monitoring circuit 50. In a case where the judging section is mounted on an external control unit (such as, for instance, an ECU), in normal practice, a related input preceding stage (such as, for instance, the detecting section 43, etc.) converts the detection signal into a given signal format available for the external control unit to perform signal processing.

Also, the resistors 22 to 24 have resistance values that are properly selected for the transistor 21 to perform operation described below.

Here, the anode terminal A of the diode 11 is connected to the positive electrode terminal of the battery 61 via the load circuit 66 and the cathode terminal K of the diode 11 is connected to the negative electrode terminal of the battery 61 via the inrush current limiting resistor 65 and the subsidiary power switch 64. Thus, the diode 11 is connected in an orientation not to prevent the supply of electric power to the load circuit 66 from the battery 61. In other words, the diode 11 is connected to the battery 61 in a forward direction.

On the contrary, the control power supply 41 has the positive electrode terminal connected via the emitter terminal E and the base terminal B of the transistor 21, the resistor 23 and the protection diode 36 to the cathode K of the diode 11 and the negative electrode terminal connected to the anode terminal A of the diode 11. Stated another way, the diode 11 is connected to the control power supply 41 in a reverse direction.

First, description is made of the operation of supplying electric power to the load circuit 66.

In order to supply electric power to the load circuit 66, initially, the main power switch 62 on the positive electrode side and the subsidiary power switch 64 are turned on to cause the charging of the smoothing capacitor 68 at a given voltage level via the inrush current limiting resistor 65, after which the main power switch 63 on the negative electrode side is turned on. In such a way, a large inrush current is prevented from flowing through the circuits.

Next, description is made of the detecting operation of the subsidiary power switch shutoff failure monitoring circuit (monitoring circuit) 50.

(Under Normal State of Subsidiary Power Switch 64)

Under a condition where the main power switch 62 on the positive electrode side is on and the main power switch 63 on the negative electrode side is off with the subsidiary power switch 64 reaming off, if the subsidiary power switch 64 assumes a normal state, the load circuit 66 is completely shut off from the negative electrode terminal of the battery 61. Therefore, even if the main power switch 62 on the positive electrode side is on, no current flows from the battery 61 to the load circuit 66. At this moment, the diode 11 is applied with only the voltage from the control power supply 41 in a reverse direction and no current flows through the diode 11 due to rectifying operation of the diode. Accordingly, during the normal state, no current flows through the resistor 24 between the collector terminal C of the transistor 21 and the anode terminal A of the diode 11 and a voltage drop across the resistor 24, monitored with the detecting section 42, is zeroed.

(Under Failure State of Subsidiary Power Switch 64)

However, when deterioration occurs in the subsidiary power switch 64 and the subsidiary power switch 64 falls in an incomplete shutoff status, a leak current i1 flows from the positive electrode terminal of the battery 61 to pass in a path including the main power switch 62, the load circuit 66, the diode 11, the inrush current limiting resistor 65 and the subsidiary power switch 64 even under a circumstance where the main power switch 64 on the positive electrode side is on and the power switch 63 on the negative electrode side is off while the subsidiary power switch 64 is off. When this takes place, the leak current i1 flows through the diode 11 in a forward direction from the anode terminal A thereof to the cathode terminal K thereof. Then, due to the presence of a reverse voltage applied to the diode 11 from the control power supply 41, a reverse current i2 flows under a superposed state so as to cancel the forward current i1. The reverse current i2 has a magnitude, not exceeding the forward current i1, which is determined according to the characteristic of the transistor 21 and resistance values of the resistors 22 to 24.

Since the reverse current i2 acts as a base current of the transistor 21 flowing from the emitter terminal E to the base terminal B, an increased collector current i3 flows from the emitter terminal E to the collector terminal C due to an amplifying action. The collector current i3 recirculates through the resistor 24 and the anode terminal A of the diode 11 to the negative electrode terminal of the control power supply 41. In such a way, the collector current i3 increases with an increase in the magnitude of the leak current i1. Accordingly, connecting the detecting section 42 between the collector terminal C and the anode terminal A on both sides of the resistor 24 for detecting a voltage across these elements results in a capability of detecting a voltage drop with a value multiplying the collector current i3 and the resistance value of the resistor 24 during a failure.

Thus, the control power supply 41, the transistor 21 and the resistor 24, with which the outputting section 52 is formed, collaborate with each other to have a function to output a voltage, reflecting the magnitude of the forward current of the diode 11, to the detecting section 42. In addition, the detecting section 42 may be connected so as to detect a voltage across the emitter terminal E and the collector terminal C of the transistor 21.

The detecting section 42 outputs a detected voltage or a related output signal to the judging section 43. The judging section 43 compares a value of the signal received from the detecting section 42 to a given threshold value and makes judgment to determine the presence of or absence of a shutoff failure caused in the subsidiary power switch 64.

In such operation, if judgment is made that the shutoff failure is present, then, various operations, including a step of providing an alarm, which are required to address the shutoff failure of the subsidiary power switch 64 can be performed if required.

Further, since the monitoring circuit 50 performs a function to sense a current flowing through the inrush current limiting circuit 69, a current flows through the diode 11 during the supply of electric power to the electrical load 67 even when the subsidiary power switch 64 operates in a normal state. In order to avoid the judging section 43 from making erroneous judgment that the current flowing through the diode 11 is an excessive leak current, the monitoring circuit 50 may be designed so as to interrupt a judging operation during a startup of supplying electric power (that is, when the subsidiary power switch 64 is on).

(Effect)

As set forth above, the subsidiary power switch shutoff failure monitoring circuit (monitoring circuit) 50 of the present invention has a function to monitor the shutoff failure of the subsidiary power switch upon monitoring the forward current flowing through the diode during an off state of the subsidiary power switch 64 and the main power switch 63 on the negative electrode side and comparing the forward current to the given threshold value.

Thus, the monitoring circuit 50 provided with the diode 11 having the function to sense the current flowing through the subsidiary power switch 64 via the inrush current limiting resistor 65 when the subsidiary power switch 64 is off, the monitoring circuit 50 of the present invention can monitor the shutoff failure of the subsidiary power switch without using a voltage drop across the inrush current limiting resistor 65. Therefore, a design of a detecting characteristic can be achieved in a manner impervious to a design of an inrush current characteristic.

Further, by properly monitoring (for instance, monitoring at all times or at fixed intervals) a leak current before the subsidiary power switch 64 is on when supplying of, for instance, electric power from the battery 61 to the load circuit 66, the shutoff failure of the subsidiary power switch can be detected on an earlier stage.

In addition, with the outputting section of the monitoring circuit employing the transistor 21, the monitoring and detecting of the shutoff failure caused in the subsidiary power switch 64 can be realized with a simplified circuit structure.

(First Modified Form)

A first modified form of the present invention is described below with reference to a circuit diagram shown in FIG. 2. In contrast to the circuit configuration, shown in FIG. 1, which includes the inrush current limiting circuit 69 connected in parallel to the main power switch 62 on the negative electrode side, an exemplary circuit, shown in FIG. 2, has a structure wherein an inrush current limiting circuit is connected in parallel to the main power switch 62 on the positive electrode side and the circuit is described below with a focus on features different from those of FIG. 1. In addition, the component parts providing the same functions as those of the exemplary circuit shown in FIG. 1 bear like reference numerals.

The subsidiary power switch 64, the sensor diode 11 and the inrush current limiting resistor 65 are connected in series to the battery 61 in this order. That is, with the inrush current limiting circuit 69, the diode 11 is connected in series to between the subsidiary power switch 64 and the inrush current limiting resistor 65, both of which act as components of the inrush current limiting circuit 69. Moreover, the inrush current limiting circuit 69 is connected in parallel to the power switch 62 on the positive electrode side.

The subsidiary power switch shutoff failure monitoring circuit (monitoring circuit) 50 includes an NPN type transistor 26, the direct current power supply 41 and the detecting section 42, which are connected in a manner described below. The transistor 26 has an emitter terminal E connected via a resistor 27 to a base terminal B that in turn is connected in series to the anode terminal A of the diode 11 via a resistor 28 and a protection diode 36. A collector terminal C is connected to the cathode terminal K of the cathode 11 via a resistor 29. The control power supply 41 has a positive electrode terminal connected to the cathode K of the diode 11 and a negative electrode terminal connected to the emitter terminal E. Further, the detecting section 42 is connected to between the cathode terminal K of the diode 11 and the collector terminal C of the transistor 26 for detecting a voltage across the resistor 29.

Even with such a structure, the subsidiary power switch shutoff failure monitoring circuit (monitoring circuit) 50 operates in the same manner as that of the first embodiment shown in FIG. 1. Under a status where with the subsidiary power switch 64 remaining in a normal state, no remarkable leak current flows and under a status where a deterioration occurs in a shutoff characteristic of the subsidiary power switch 64, a base current and collector current i4 flows in accord with an increase in the leak current. Consequently, the detecting section 42 detects a voltage drop with a value multiplying the collector current i4 and a resistance value of the resistor 29 and outputs a related signal to the judging section 43. The judging section 43 is sufficed to compare the voltage drop, received from the detecting section 42, to a preset threshold value for judgment.

(Second Modified Form)

Figure 3:
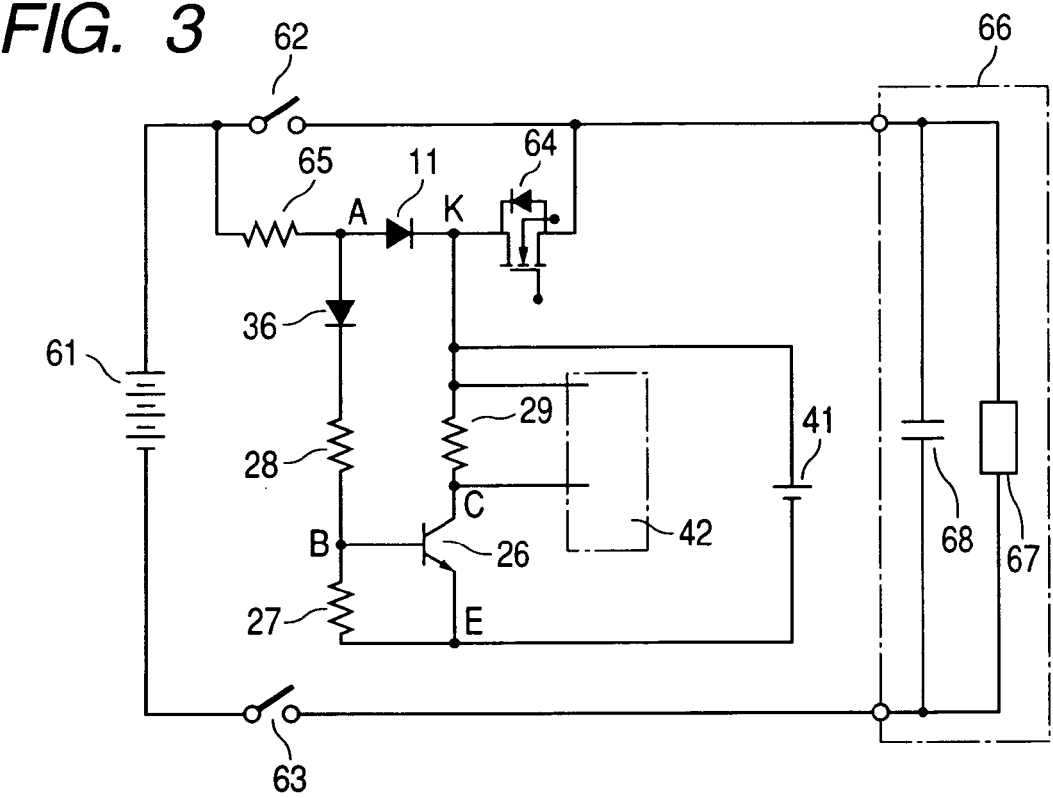
FIG. 3 is a circuit diagram showing an inrush current limiting switching circuit of a second modified form of the present invention.

A second modified form of the present invention is described below with reference to a circuit diagram of FIG. 3. FIG. 3 shows another circuit structure with the subsidiary power switch 64 and the inrush current limiting resistor 65, acting as components of the inrush current limiting circuit 69, and the sensor diode 11 connected in an altered order. The inrush current limiting resistor 65, the sensor diode 11 and the subsidiary power switch 64 are connected to the battery 61 in this order.

With such a modified form, the inrush current limiting resistor 65 and the sensor diode 11 are directly connected to the battery 61 with no capability of disconnecting these components (under a state where no electric power is supplied from the main power supply upon being off the subsidiary power switch 64). On the contrary, with the second modified form shown in FIG. 2, being off the subsidiary power switch 64 enables the relevant component parts to be disconnected. Accordingly, the first modified form, shown in FIG. 2, is superior to the second modified form in that the relevant component parts can be easily checked, repaired and replaced.

Thus, the inrush current limiting resistor 65 and the sensor diode 11 may be preferably connected to the electrical load 66 at a location closer thereto than the subsidiary power switch 64. By arranging the elements to be connected in the order mentioned above, turning off the subsidiary power switch 64 enables the inrush current limiting resistor 65 and the sensor diode 11 to be safely disconnected from the direct current power supply 61. This results in a capability of providing an ease of checking, repairing and replacing a checkup circuit including these component elements.

(Third Modified Form)

Figure 4:
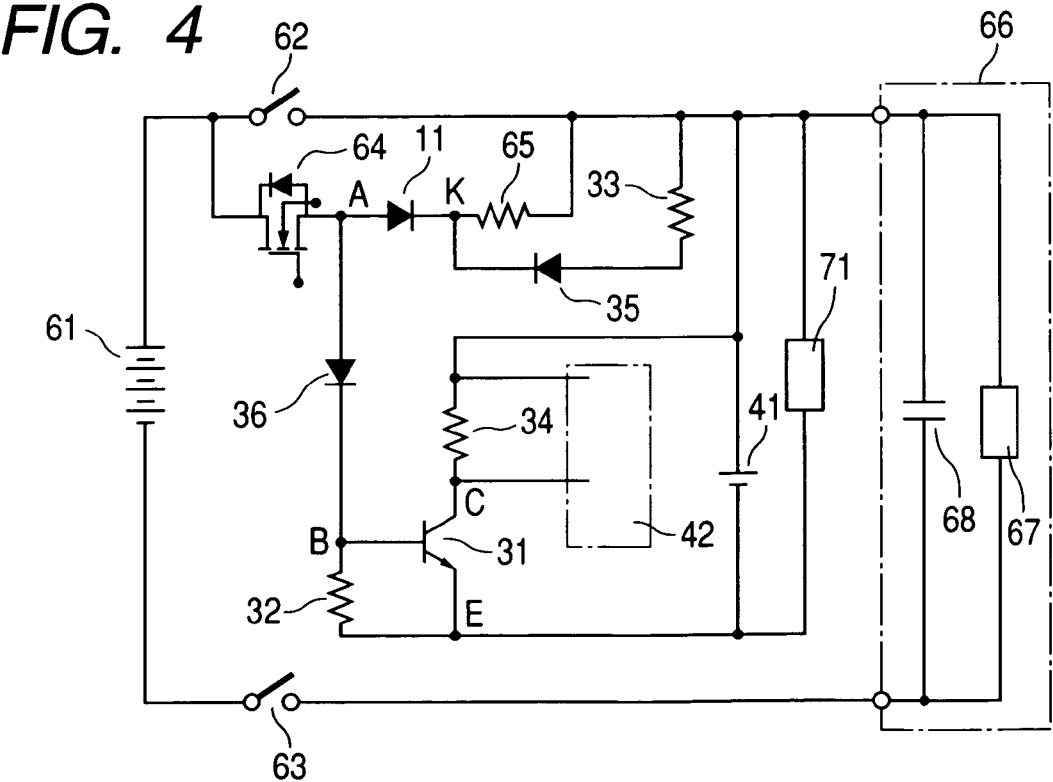
FIG. 4 is a circuit diagram showing an inrush current limiting switching circuit of a third modified form of the present invention.

A third modified form of the present invention is described below with reference to a circuit diagram of FIG. 4. FIG. 4 shows another example of a modified form of the modification shown in FIG. 2. This modified form is slightly complicated in circuit structure but has an advantage of easily sharing the control power supply 41 with another circuit. The third modified form differs from the first modified form shown in FIG. 2 in respect of features described below.

An NPN type transistor 31 has an emitter terminal E connected via a resistor 32 to a base terminal B, which in turn is connected through a protection diode 36 to an anode A of a diode 11, and a collector terminal C connected to a positive electrode terminal of the control power supply 41 via a resistor 34. The control power supply 41 has a positive electrode terminal connected to a terminal, at a location closer to the electrical load 67, of the main power switch 62 and a negative electrode terminal connected to the emitter terminal E. Moreover, a series circuit of a resistor 33 and a control diode 35 is connected in parallel to the inrush current limiting resistor 65 and the control diode 35 has a cathode electrode connected to a cathode electrode K of the diode 11. Even with the resistor 33 additionally connected to the control diode 35, the control diode 35 acts to keep a charging time constant of a smoothing capacitor 68 unchanged during a startup of supplying electric power. Moreover, a monitoring control circuit 71 is connected in parallel as a load of the control power supply 41 for another application in monitoring a voltage or the like.

Figure 2:
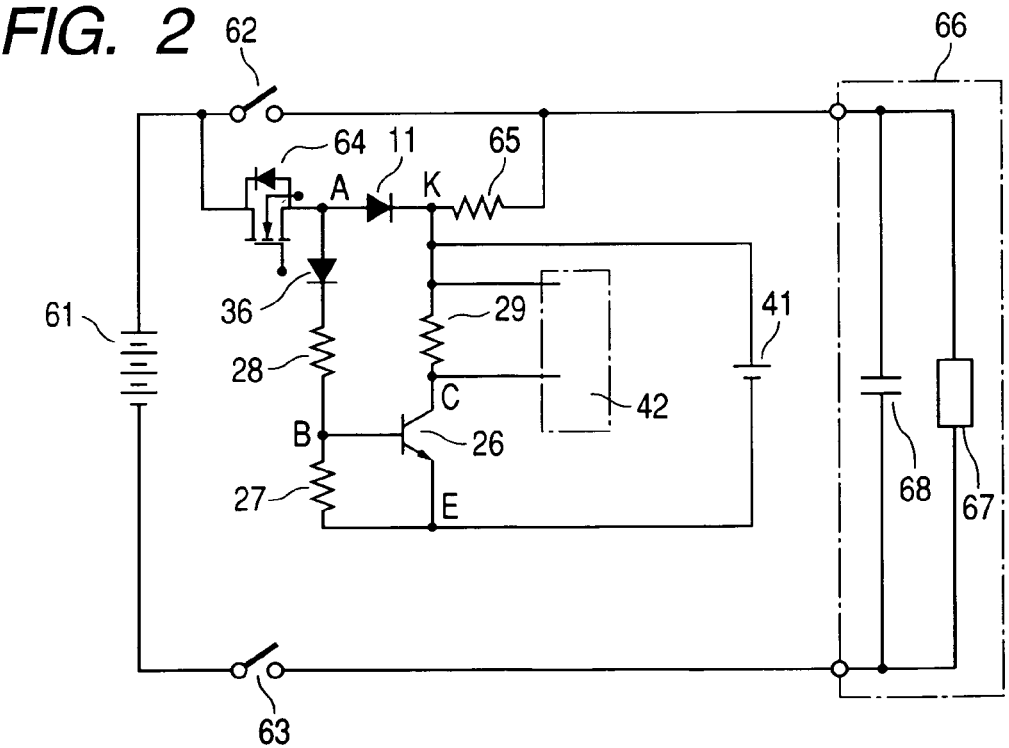
FIG. 2 is a circuit diagram showing an inrush current limiting switching circuit of a first modified form of the present invention.

Even with such a structure, the subsidiary power switch shutoff failure monitoring circuit (monitoring circuit) 50 operates in the same manner as that of the first modified form shown in FIG. 2. With this structure, the positive electrode terminal of the control power supply 41 is connected to a connection line between the battery 61 and the electrical load 67 and connecting another monitoring circuit 71 to such a connection line enables the control power supply 41 to be shared with no provision of new wiring.

(Other Modified Forms)

While the various embodiments have been described above with reference to exemplary cases where with the vehicular inrush current limiting switching circuit, the main power switch includes the switch 62 on the positive electrode side and the switch 63 on the negative electrode side, the main power switch may include either one of the switch on the positive electrode side and the switch on the negative electrode side.

Figure 5:
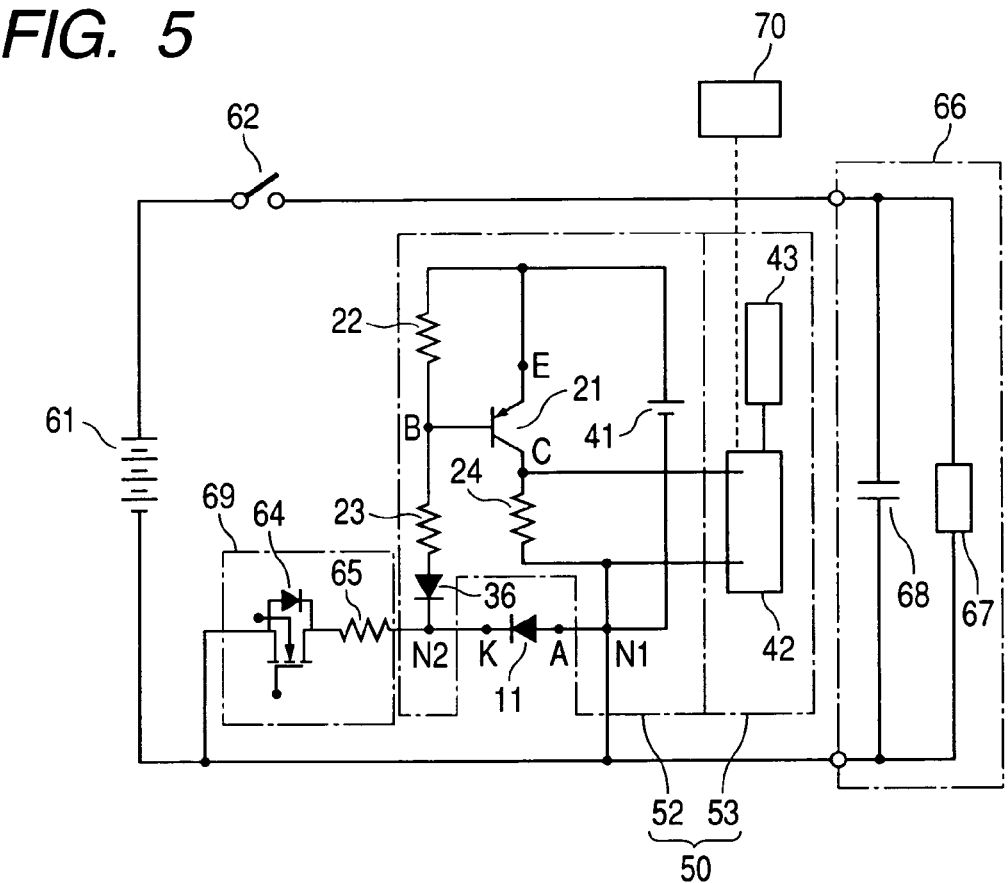
FIG. 5 is a circuit diagram showing an inrush current limiting switching circuit of one of other modified form according to the present invention.
Figure 6:
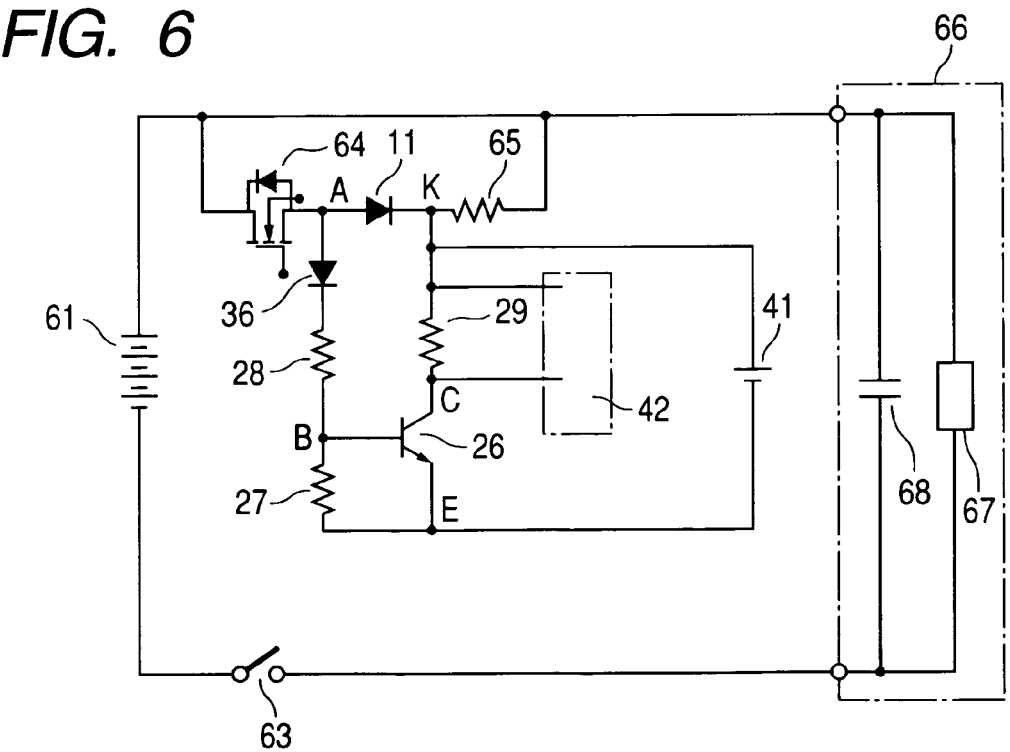
FIG. 6 is a circuit diagram showing an inrush current limiting switching circuit of another other modified form of the present invention.

For instance, the best mode of the embodiments and the first to third modified forms may include only the switch 62 on the positive electrode side and a similar effect can be obtained without the inclusion of the switch 63 on the negative electrode side. (FIG. 5) Alternately, the best mode of the embodiments and the first to third modified forms may include only the switch on the negative electrode side 63 and obtain a similar effect without the inclusion of the switch 62 on the positive electrode side. (FIG. 6) Further, with the various embodiments described above, the MOS transistor is used as the subsidiary power switch, the subsidiary power switch may include an IGBT, a bipolar transistor and electromagnetic relay or the like. Even in a case where an electric relay or the like other than the semiconductor-switching device is applied to the subsidiary power switch, the monitoring of the leak current described above is effective for a failure such as a drop in a breakdown voltage.

Although there has been described above specific in a rush current limiting switching circuit having a monitoring circuit for monitoring the leak current of the second switch in turned-of state thereof when the first and second switches are turned off in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered be within the scope of the invention.

What is claimed is that:

1. A switching circuit for selectively connecting or disconnecting a first power supply to an electrical load having an electrostatic capacitance, comprising:
   a first switch selectively connecting or disconnecting the first power supply to the electrical load;
   an inrush current limiting circuit connected in parallel with the first switch and including a second switch and a resistor, the resistor serially connected to the second switch, the second switch selectively connecting or disconnecting the first power supply and the electrical load, and the second switch being on before the first switch is turned on;
   a diode serially connected to the second switch and connected to the first power supply in a forward direction thereof, the diode sensing an electric current passing through the second switch when both the first and second switches are in an off state; and
   a monitoring circuit monitoring the electric current when the second switch is in an off state.

2. The switching circuit according to claim 1, wherein the monitoring circuit is configured to output an output signal corresponding to the current to an external control device.

3. The switching circuit according to claim 1, wherein the monitoring circuit is configured to compare the current monitored and a predetermined threshold and decide a failure occurrence in the second switch when the current is greater than the predetermined threshold.

4. The switching circuit according to claim 1, wherein the second switch is a semiconductor switching device.

5. The switching circuit according to claim 1, wherein the monitoring circuit comprises a second power supply, the second power supply being connected to the diode in a reverse direction thereof.

6. The switching circuit according to claim 1, wherein the switching circuit consists of only the first switch on either a positive or a negative side of the direct current power supply.

7. The switching circuit according to claim 1, wherein the switching circuit has the first switch on both a positive and a negative side of the first power supply and the inrush current limiting circuit on either the positive or the negative side of the direct current power supply.

8. The switching circuit according to claim 1, wherein both a distance between the diode and the electrical load and a distance between the resistor and the electrical load are shorter than a distance between the second switch and the electrical load.

9. The switching circuit according to claim 1, wherein the inrush current limiting circuit locates on a negative side of the first power supply, the monitoring circuit has a PNP-type transistor, an emitter terminal thereof is connected to a base terminal thereof via a first resistor, the base terminal is connected to a cathode of the diode via a second resistor, a collector terminal thereof is connected to an anode of the diode via a third resistor, the monitoring circuit has a second direct current power supply for supplying an electric power to the PNP-type transistor, a positive and a negative terminal of the second direct current power are connected to the emitter terminal and the anode respectively, and the monitoring circuit is formed to monitor a voltage between the collector and the anode, compare the voltage and a predetermined value, and decide whether or not a failure on the second switch occurs.

10. The switching circuit according to claim 1, wherein the inrush current limiting circuit locates on a positive side of the direct current power supply, the monitoring circuit has a NPN-type transistor, an emitter terminal thereof is connected to a base terminal thereof via a first resistor, the base terminal is connected to an anode of the diode via a second resistor, a collector terminal thereof is connected to a cathode of the diode via a third resistor, the monitoring circuit has a second direct current power supply for supplying an electric power to the NPN-type transistor, a positive and a negative terminal of the second direct current power are connected to the cathode and the emitter terminal respectively, the monitoring circuit is formed to monitor a voltage between the collector and the cathode, compare the voltage and a predetermined value, and decide whether or not a failure on the second switch occurs.

11. A switching circuit for selectively connecting or disconnecting a first power supply to an electrical load having an electrostatic capacitance, comprising:

a first switch selectively connecting or disconnecting the first power supply to the electrical load;

an inrush current limiting circuit including a second switch and a resistor, the resistor serially connected to the second switch, the second switch selectively connecting or disconnecting the first power supply and the electrical load, and the second switch being on before the first switch is turned on;

a diode serially connected to the second switch and connected to the first power supply in a forward direction thereof, the diode sensing an electric current passing through the second switch when both the first and second switches are in an off state; and a monitoring circuit monitoring the electric current when the second switch is in an off state, wherein the inrush current limiting circuit locates on a negative side of the first power supply, the monitoring circuit has a PNP-type transistor, an emitter terminal thereof is connected to a base terminal thereof via a first resistor, the base terminal is connected to a cathode of the diode via a second resistor, a collector terminal thereof is connected to an anode of the diode via a third resistor, the monitoring circuit has a second direct current power supply for supplying an electric power to the PNP-type transistor, a positive and a negative terminal of the second direct current power are connected to the emitter terminal and the anode respectively, and the monitoring circuit is formed to monitor a voltage between the collector and the anode, compare the voltage and a predetermined value, and decide whether or not a failure on the second switch occurs.

12. A switching circuit for selectively connecting or disconnecting a first power supply to an electrical load having an electrostatic capacitance, comprising:

a first switch selectively connecting or disconnecting the first power supply to the electrical load;

an inrush current limiting circuit including a second switch and a resistor, the resistor serially connected to the second switch, the second switch selectively connecting or disconnecting the first power supply and the electrical load, and the second switch being on before the first switch is turned on;

a diode serially connected to the second switch and connected to the first power supply in a forward direction thereof, the diode sensing an electric current passing through the second switch when both the first and second switches are in an off state; and a monitoring circuit monitoring the electric current when the second switch is in an off state, wherein the inrush current limiting circuit locates on a positive side of the direct current power supply, the monitoring circuit has a NPN-type transistor, an emitter terminal thereof is connected to a base terminal thereof via a first resistor, the base terminal is connected to an anode of the diode via a second resistor, a collector terminal thereof is connected to a cathode of the diode via a third resistor, the monitoring circuit has a second direct current power supply for supplying an electric power to the NPN-type transistor, a positive and a negative terminal of the second direct current power are connected to the cathode and the emitter terminal respectively, the monitoring circuit is formed to monitor a voltage between the collector and the cathode, compare the voltage and a predetermined value, and decide whether or not a failure on the second switch occurs.

* * * * *